(12) United States Patent
Xu et al.

(10) Patent No.: US 11,178,567 B2
(45) Date of Patent: Nov. 16, 2021

(54) BEARER MAPPING METHOD AND DEVICE THEREOF, BASE STATION AND TERMINAL

(71) Applicant: CHINA ACADEMY OF TELECOMMUNICATIONS TECHNOLOGY, Beijing (CN)

(72) Inventors: Meng Xu, Beijing (CN); Li Chen, Beijing (CN); Fangli Xu, Beijing (CN); Jing Liang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 16/638,398

(22) PCT Filed: Aug. 10, 2018

(86) PCT No.: PCT/CN2018/099895
§ 371 (c)(1),
(2) Date: Feb. 11, 2020

(87) PCT Pub. No.: WO2019/029683
PCT Pub. Date: Feb. 14, 2019

(65) Prior Publication Data
US 2020/0367091 A1    Nov. 19, 2020

(30) Foreign Application Priority Data
Aug. 11, 2017  (CN) .......................... 201710686917.5

(51) Int. Cl.
*H04W 28/02* (2009.01)
*H04W 76/34* (2018.01)
(Continued)

(52) U.S. Cl.
CPC ....... *H04W 28/0263* (2013.01); *H04L 1/1614* (2013.01); *H04L 5/0098* (2013.01);
(Continued)

(58) Field of Classification Search
CPC ..... H04W 76/11; H04W 76/15; H04W 76/34; H04L 5/0098; H04L 1/08
See application file for complete search history.

(56) References Cited

U.S. PATENT DOCUMENTS

2013/0163543 A1   6/2013  Freda et al.
2018/0199315 A1*  7/2018  Hong ................... H04W 88/10
(Continued)

FOREIGN PATENT DOCUMENTS

CN     105991261 A    10/2016
CN     106304248 A     1/2017
(Continued)

OTHER PUBLICATIONS

Extended European Search Report, PCT/CN2018099895, dated Jul. 10, 2020, Applicant: China Academy of Telecommunications Technology.
(Continued)

*Primary Examiner* — Gary Mui
(74) *Attorney, Agent, or Firm* — Harness, Dickey & Pierce, P.L.C.

(57) ABSTRACT

A bearer mapping method and a device thereof, a base station and a terminal are provided, so as to solve how to unify the mapping relationship between the bitmap of the MAC CE of the duplication activation/deactivation at the network side and that at the terminal side. The method includes: indicating a mapping relationship between a bearer ID and a bitmap in an MAC CE, where the MAC CE is a control element for a duplication activation indication or deactivation indication, and the bearer ID is an ID of a bearer configured with a duplication function.

14 Claims, 3 Drawing Sheets

(51) Int. Cl.
*H04W 76/11* (2018.01)
*H04L 1/16* (2006.01)
*H04L 5/00* (2006.01)
*H04W 80/02* (2009.01)

(52) U.S. Cl.
CPC ............ *H04W 76/11* (2018.02); *H04W 76/34* (2018.02); *H04W 80/02* (2013.01)

(56) References Cited

U.S. PATENT DOCUMENTS

| | | | | |
|---|---|---|---|---|
| 2018/0368107 | A1* | 12/2018 | Babaei | H04L 27/2608 |
| 2018/0368132 | A1* | 12/2018 | Babaei | H04W 80/02 |
| 2020/0092746 | A1* | 3/2020 | Baek | H04W 28/06 |
| 2020/0169917 | A1* | 5/2020 | Tang | H04L 1/18 |
| 2020/0170073 | A1* | 5/2020 | Liu | H04W 72/1247 |

FOREIGN PATENT DOCUMENTS

| | | |
|---|---|---|
| EP | 3422622 A1 | 1/2019 |
| EP | 3606274 A1 | 2/2020 |
| JP | 2015-505436 A | 2/2015 |
| WO | 2016114700 A1 | 7/2016 |
| WO | 2016206553 A1 | 12/2016 |

OTHER PUBLICATIONS

3GPP TSG-RAN WG2 Meeting #98, R2-1704272, May 15-19, 2017, Hangzhou, China, Agenda Item: 10.3 1.10 Source: Nokia, Alcatel-Lucent Shanghai Bell, Title: Duplication Impacts to MAC, Document For: Discussion and Decision.
3GPP TSG-RAN WG2 Meeting #98, R2-1704578, May 15-19, 2017, Hangzhou, China, Agenda Item: 10.2 2, Source: Vivo, Title: Duplicate date in CA, Document For: Discussion and Decision.
3GPP TSG-RAN WG2#NR_AdHoc#2, R2-1706344, Jun. 27-29, 2017, Qingdao, China, Agenda Item: 10.3.1.11, Source: OPPO, Title: The impact of duplication on MAC, Document For: Discussion, Decision.
3GPP TSG-RAN WG2 #98-AH, Tdoc R2-1707173, Jun. 27-28, 2017, Qingdao, P R. of China, Agenda Item: 10.3.1.11, Source: Erisson, Title: MAC impact of PDCP duplication, Document For: Discussion, Decision.
3GPP TSG-RAN WG2 NR Ad-Hoc #2, R2-1707262, Jun. 27-29, 2017, Qingdao, China, Agenda Item: 10.3.1.11, Source: MediaTek Inc., Title: MAC CE design for duplication, Document For: Discussion and Decision.
3GPP TSG-RAN WG2 NR Ad-Hoc, R2-1707500, Jun. 27-29, 2017, Quingdao, China, Agenda Item: 11.1.1, Source: Vice-Chairwoman (InterDigital), Title: Report from NR User Plane Break-Out Session, Document For: Approval.
Japanese Office Action dated Aug. 17, 2021 for Japanese Patent Application No. 2020-529799.
CATT, "Duplication Activation/Deactivation MAC CE", Agenda Item 10.3.1.11, 3GPP TSG-RAN WG2 #99, R2-1707921, Aug. 21-25, 2017, Berlin, Germany.

* cited by examiner

BEARER MAPPING METHOD AND DEVICE THEREOF, BASE STATION AND TERMINAL

CROSS REFERENCE OF RELATED APPLICATION

The present application is the U.S. national phase of PCT Application PCT/CN2018/099895 filed on Aug. 10, 2018, which claims a priority of Chinese patent application No. 201710686917.5 filed on Aug. 11, 2017, which is incorporated herein by reference in its entirety.

TECHNICAL FIELD

The present disclosure relates to the field of communication applications, and in particular, to a bearer mapping method and a device thereof, a base station and a terminal.

BACKGROUND

In the mobile communication system, with the development of 4G/5G technology, in order to pursue the reliability and timeliness of the service, technologies such as dual link and carrier aggregation CA and duplication are introduced. One data bearer DRB can establish multiple branches for data duplication, the network side can notify the UE to activate or deactivate a certain branch of a bearer through a media access control layer control signaling (MAC CE). Since the UE can establish multiple bearers at the same time, and each bearer can establish multiple branches, when the network side notifies the UE side of the bearer and its branches that need to be activated or deactivated through the MAC CE, there is no clear solution of how to unify the mapping relationship between the bitmap of the MAC CE of the duplication activation/deactivation at the network side and that at the terminal side, and how to maintain the mapping relationship when establishing, modifying and cancelling the bearer.

SUMMARY

A bearer mapping method and a device thereof, a base station and a terminal are provided in the present disclosure, so as to solve how to unify the mapping relationship between the bitmap of the MAC CE of the duplication activation/deactivation at the network side and that at the terminal side.

To achieve the above objective, a bearer mapping method applied to a base station is provided in the present disclosure, including:

indicating, in an implicit or explicit manner, a mapping relationship between a bearer ID and a bitmap in a media access control layer control element (MAC CE), where the MAC CE is a control element for a duplication activation indication or deactivation indication, and the bearer ID is an ID of a bearer configured with a duplication function.

Optionally, the indicating, in the implicit manner, the mapping relationship between the bearer ID and the bitmap in the MAC CE includes:

instructing, according to a preset protocol agreement, a terminal to sort the bearer IDs according to a preset sorting rule, to obtain a bearer ID sequence, and indicating a mapping relationship between each of the bearer IDs in the bearer ID sequence and the bitmap in the MAC CE.

Optionally, the preset sorting rule includes: sorting according to a chronological order of bearer establishment or modification or sorting according to an ascending or descending order of the bearer IDs.

Optionally, the indicating the mapping relationship between each of the bearer IDs in the bearer ID sequence and the bitmap in the MAC CE includes:

instructing mapping N bearer IDs in the bearer ID sequence to N consecutive positions in the bitmap, where N is a positive integer, the bearer IDs are in a one-to-one correspondence to the positions in the bitmap.

Optionally, the indicating mapping N bearer IDs in the bearer ID sequence to N consecutive positions in the bitmap includes:

instructing mapping N bearer IDs in the bearer ID sequence to N consecutive positions in the bitmap in order, according to a present mapping rule;

the present mapping rule includes a mapping rule of mapping from a high bit to a low bit or a mapping rule of mapping from a low bit to a high bit.

Optionally, subsequent to the indicating the mapping relationship between each of the bearer IDs in the bearer ID sequence and the bitmap in the MAC CE, the method further includes:

when establishing a new bearer, adding, according to a bearer ID of the new bearer and the preset sorting rule, the bearer ID of the new bearer at a corresponding position in the bearer ID sequence; and/or when releasing the bearer, cancelling the bearer ID of the bearer to be released from the bearer ID sequence; and/or when modifying the bearer, updating the bearer ID sequence according to the preset sorting rule.

Optionally, the when modifying the bearer, updating the bearer ID sequence according to the preset sorting rule includes:

in the case that the bearer ID of the bearer is modified, updating the bearer ID sequence according to the modified bearer ID and the preset sorting rule;

in the case that the bearer ID of the bearer is not modified, updating the bearer ID sequence according to the preset sorting rule.

Optionally, the indicating, in the explicit manner, the mapping relationship between the bearer ID and the bitmap in the MAC CE includes:

indicating the mapping relationship between the bearer ID and the bitmap in the MAC CE through a high-layer signaling.

Optionally, the indicating the mapping relationship between the bearer ID and the bitmap in the MAC CE through the high-layer signaling includes:

carrying, in a bearer establishment instruction, a mapping relationship between a bearer ID of a new bearer and the bitmap; and/or carrying, in a bearer releasing instruction, a mapping relationship between a bearer ID of a bearer to be released and the bitmap or the bearer ID of the bearer to be released or indication information indicating that the bearer does not have the duplication function; and/or carrying, in a bearer modification instruction, a mapping relationship between a bearer ID of a modified bearer and the bitmap.

Optionally, subsequent to the indicating, in the implicit or explicit manner, the mapping relationship between the bearer ID and the bitmap in the MAC CE, the method further includes:

in the case that a preset operation is performed on a target branch of a target bearer and the target bearer is enabled to be configured with at least two branches where the preset operation is enabled to be performed, sending, to a terminal, a first mapping relationship between a bearer ID of the target bearer and the bitmap and a second mapping relationship between a branch ID of each target branch and the bitmap.

To achieve the above objective, a bearer mapping method applied to a terminal is further provided in the present disclosure, including:

determining, in an implicit or explicit manner, a mapping relationship between a bearer ID and a bitmap in a media access control layer control element (MAC CE), where the MAC CE is a control element for a duplication activation indication or deactivation indication, and the bearer ID is an ID of a bearer configured with a duplication function.

Optionally, the determining, in the implicit manner, the mapping relationship between the bearer ID and the bitmap in the MAC CE includes:

sorting the bearer IDs according to a preset sorting rule according to a preset protocol agreement, to obtain a bearer ID sequence, and indicating a mapping relationship between each of the bearer IDs in the bearer ID sequence and the bitmap in the MAC CE.

Optionally, the preset sorting rule includes: sorting according to a chronological order of bearer establishment or modification or sorting according to an ascending or descending order of the bearer IDs.

Optionally, the determining the mapping relationship between each of the bearer IDs in the bearer ID sequence and the bitmap in the MAC CE includes:

mapping N bearer IDs in the bearer ID sequence to N consecutive positions in the bitmap, where N is a positive integer, the bearer IDs are in a one-to-one correspondence to the positions in the bitmap.

Optionally, the mapping N bearer IDs in the bearer ID sequence to N consecutive positions in the bitmap includes:

mapping N bearer IDs in the bearer ID sequence to N consecutive positions in the bitmap in order, according to a present mapping rule;

the present mapping rule includes a mapping rule of mapping from a high bit to a low bit or a mapping rule of mapping from a low bit to a high bit.

Optionally, subsequent to the determining the mapping relationship between each of the bearer IDs in the bearer ID sequence and the bitmap in the MAC CE, the method further includes:

when establishing a new bearer, adding, according to a bearer ID of the new bearer and the preset sorting rule, the bearer ID of the new bearer at a corresponding position in the bearer ID sequence; and/or when releasing the bearer, cancelling the bearer ID of the bearer to be released from the bearer ID sequence; and/or when modifying the bearer, updating the bearer ID sequence according to the preset sorting rule.

Optionally, the when modifying the bearer, updating the bearer ID sequence according to the preset sorting rule includes:

in the case that the bearer ID of the bearer is modified, updating the bearer ID sequence according to the modified bearer ID and the preset sorting rule;

in the case that the bearer ID of the bearer is not modified, updating the bearer ID sequence according to the preset sorting rule.

Optionally, the determining, in the explicit manner, the mapping relationship between the bearer ID and the bitmap in the MAC CE includes:

determining the mapping relationship between the bearer ID and the bitmap in the MAC CE through a high-layer signaling sent by a base station.

Optionally, the determining the mapping relationship between the bearer ID and the bitmap in the MAC CE through the high-layer signaling sent by the base station includes:

determining, according to a bearer establishment instruction, a mapping relationship between a bearer ID of a new bearer and the bitmap, where the bearer establishment instruction carries the mapping relationship between the bearer ID of the new bearer and the bitmap; and/or releasing, according to a bearer releasing instruction, a mapping relationship between a bearer ID of a bearer to be released and the bitmap, where the bearer releasing instruction carries the mapping relationship between the bearer ID of the bearer to be released and the bitmap or the bearer ID of the bearer to be released or indication information indicating that the bearer does not have the duplication function; and/or determining, according to a bearer modification instruction, a mapping relationship between a bearer ID of a modified bearer and the bitmap, where the bearer modification instruction carries the mapping relationship between the bearer ID of the modified bearer and the bitmap.

Optionally, the bearer mapping method further includes:

receiving a first mapping relationship and a second mapping relationship sent by the base station, where the first mapping relationship is a mapping relationship between a bearer ID of a target bearer and the bitmap, and the second mapping relationship is a mapping relationship between a target branch of the target bearer and the bitmap, and the first mapping relationship and the second mapping relationship are sent in the case that the base station performs a preset operation on the target branch of the target bearer and the target bearer is enabled to be configured with at least two branches where the preset operation is enabled to be performed;

performing the preset operation on the target branch of the target bearer according to the first mapping relationship and the second mapping relationship.

To achieve the above objective, a bearer mapping device applied to a base station is further provided in the present disclosure, including:

an indication module, configured to indicate, in an implicit or explicit manner, a mapping relationship between a bearer ID and a bitmap in a media access control layer control element (MAC CE), where the MAC CE is a control element for a duplication activation indication or deactivation indication, and the bearer ID is an ID of a bearer configured with a duplication function.

Optionally, the indication module is configured to:

instruct, according to a preset protocol agreement, a terminal to sort the bearer IDs according to a preset sorting rule, to obtain a bearer ID sequence, and indicate a mapping relationship between each of the bearer IDs in the bearer ID sequence and the bitmap in the MAC CE.

Optionally, the preset sorting rule includes: sorting according to a chronological order of bearer establishment or modification or sorting according to an ascending or descending order of the bearer IDs.

Optionally, the indication module is configured to:

instruct mapping N bearer IDs in the bearer ID sequence to N consecutive positions in the bitmap, where N is a positive integer, the bearer IDs are in a one-to-one correspondence to the positions in the bitmap.

Optionally, the indication module is configured to:

instruct mapping N bearer IDs in the bearer ID sequence to N consecutive positions in the bitmap in order, according to a present mapping rule;

the present mapping rule includes a mapping rule of mapping from a high bit to a low bit or a mapping rule of mapping from a low bit to a high bit.

Optionally, the bearer mapping device further includes:

a first updating module, configured to, when establishing a new bearer, add, according to a bearer ID of the new bearer and the preset sorting rule, the bearer ID of the new bearer at a corresponding position in the bearer ID sequence; and/or a second updating module, configured to, when releasing the bearer, cancel the bearer ID of the bearer to be released from the bearer ID sequence; and/or a third updating module, configured to, when modifying the bearer, update the bearer ID sequence according to the preset sorting rule.

Optionally, the third updating module includes:

a first updating unit, configured to, in the case that the bearer ID of the bearer is modified, update the bearer ID sequence according to the modified bearer ID and the preset sorting rule;

a second updating unit, configured to, in the case that the bearer ID of the bearer is not modified, update the bearer ID sequence according to the preset sorting rule.

Optionally, the indication module is configured to: indicate the mapping relationship between the bearer ID and the bitmap in the MAC CE through a high-layer signaling.

Optionally, the indication module comprises:

a first processing sub-module, configured to, carry, in a bearer establishment instruction, a mapping relationship between a bearer ID of a new bearer and the bitmap; and/or a second processing sub-module, configured to, carry, in a bearer releasing instruction, a mapping relationship between a bearer ID of a bearer to be released and the bitmap or the bearer ID of the bearer to be released or indication information indicating that the bearer does not have the duplication function; and/or a third processing sub-module, configured to, carry, in a bearer modification instruction, a mapping relationship between a bearer ID of a modified bearer and the bitmap.

Optionally, the bearer mapping device further includes:

a sending module, configured to, in the case that a preset operation is performed on a target branch of a target bearer and the target bearer is enabled to be configured with at least two branches where the preset operation is enabled to be performed, send, to a terminal, a first mapping relationship between a bearer ID of the target bearer and the bitmap and a second mapping relationship between a branch ID of each target branch and the bitmap.

To achieve the above objective, a base station is further provided in the present disclosure, including: a memory, a processor and a computer program stored in the memory and executable on the processor, where the processor executes the computer program to:

indicate, in an implicit or explicit manner, a mapping relationship between a bearer ID and a bitmap in a media access control layer control element (MAC CE), where the MAC CE is a control element for a duplication activation indication or deactivation indication, and the bearer ID is an ID of a bearer configured with a duplication function.

To achieve the above objective, a computer-readable storage medium storing a computer program is further provided in the present disclosure, where the computer program is executed by a processor to:

indicate, in an implicit or explicit manner, a mapping relationship between a bearer ID and a bitmap in a media access control layer control element (MAC CE), where the MAC CE is a control element for a duplication activation indication or deactivation indication, and the bearer ID is an ID of a bearer configured with a duplication function.

To achieve the above objective, a bearer mapping device applied to a terminal is further provided in the present disclosure, including:

a determining module, configured to determine, in an implicit or explicit manner, a mapping relationship between a bearer ID and a bitmap in a media access control layer control element (MAC CE), where the MAC CE is a control element for a duplication activation indication or deactivation indication, and the bearer ID is an ID of a bearer configured with a duplication function.

Optionally, the determining module is configured to:

sort the bearer IDs according to a preset sorting rule according to a preset protocol agreement, to obtain a bearer ID sequence, and indicate a mapping relationship between each of the bearer IDs in the bearer ID sequence and the bitmap in the MAC CE.

Optionally, the preset sorting rule includes: sorting according to a chronological order of bearer establishment or modification or sorting according to an ascending or descending order of the bearer IDs.

Optionally, the determining module is configured to:

map N bearer IDs in the bearer ID sequence to N consecutive positions in the bitmap, where N is a positive integer, the bearer IDs are in a one-to-one correspondence to the positions in the bitmap.

Optionally, the determining module is configured to:

map N bearer IDs in the bearer ID sequence to N consecutive positions in the bitmap in order, according to a present mapping rule;

the present mapping rule includes a mapping rule of mapping from a high bit to a low bit or a mapping rule of mapping from a low bit to a high bit.

Optionally, the bearer mapping device further includes:

a fourth updating module, configured to, when establishing a new bearer, add, according to a bearer ID of the new bearer and the preset sorting rule, the bearer ID of the new bearer at a corresponding position in the bearer ID sequence; and/or a fifth updating module, configured to, when releasing the bearer, cancel the bearer ID of the bearer to be released from the bearer ID sequence; and/or a sixth updating module, configured to, when modifying the bearer, update the bearer ID sequence according to the preset sorting rule.

Optionally, the sixth updating module comprises:

a third updating unit, configured to, in the case that the bearer ID of the bearer is modified, update the bearer ID sequence according to the modified bearer ID and the preset sorting rule;

a fourth updating unit, configured to, in the case that the bearer ID of the bearer is not modified, update the bearer ID sequence according to the preset sorting rule.

Optionally, the determining module is configured to:

determine the mapping relationship between the bearer ID and the bitmap in the MAC CE through a high-layer signaling sent by a base station.

Optionally, the determining module includes:

a first determining sub-module, configured to determine, according to a bearer establishment instruction, a mapping relationship between a bearer ID of a new bearer and the bitmap, where the bearer establishment instruction carries the mapping relationship between the bearer ID of the new bearer and the bitmap; and/or a second determining sub-module, configured to release, according to a bearer releasing instruction, a mapping relationship between a bearer ID of a bearer to be released and the bitmap, where the bearer releasing instruction carries the mapping relationship between the bearer ID of the bearer to be released and the bitmap or the bearer ID of the bearer to be released or indication information indicating that the bearer does not have the duplication function; and/or a third determining sub-module, configured to determine, according to a bearer modification instruction, a mapping relationship between a bearer ID of a modified bearer and the bitmap, where the bearer modification instruction carries the mapping relationship between the bearer ID of the modified bearer and the bitmap.

Optionally, the bearer mapping device further includes:

a receiving module, configured to receive a first mapping relationship and a second mapping relationship sent by the base station, where the first mapping relationship is a mapping relationship between a bearer ID of a target bearer and the bitmap, and the second mapping relationship is a mapping relationship between a target branch of the target bearer and the bitmap, and the first mapping relationship and the second mapping relationship are sent in the case that the base station performs a preset operation on the target branch of the target bearer and the target bearer is enabled to be configured with at least two branches where the preset operation is enabled to be performed;

a processing module, configured to perform the preset operation on the target branch of the target bearer according to the first mapping relationship and the second mapping relationship.

To achieve the above objective, a terminal is further provided in the present disclosure, including: a memory, a processor and a computer program stored in the memory and executable on the processor, where the processor executes the computer program to:

determine, in an implicit or explicit manner, a mapping relationship between a bearer ID and a bitmap in a media access control layer control element (MAC CE), where the MAC CE is a control element for a duplication activation indication or deactivation indication, and the bearer ID is an ID of a bearer configured with a duplication function.

To achieve the above objective, a computer-readable storage medium storing a computer program, where the computer program is executed by a processor to:

determine, in an implicit or explicit manner, a mapping relationship between a bearer ID and a bitmap in a media access control layer control element (MAC CE), where the MAC CE is a control element for a duplication activation indication or deactivation indication, and the bearer ID is an ID of a bearer configured with a duplication function.

According to the present disclosure, a mapping relationship between a bearer ID and a bitmap in an MAC CE is indicated in an implicit or explicit manner, so that the terminal and the network side may determine the bearer represented by each bit in the bitmap, and then the terminal and the network side may determine clearly through the MAC CE the bearer needed to be activated or deactivated and the branch thereof.

DETAILED DESCRIPTION

To make the technical issue to be solved, technical solutions and advantages of the present disclosure clearer, the present disclosure will be described in details below with reference to the embodiments and the drawings.

A bearer mapping method and a device thereof, a base station and a terminal are provided in some embodiments of the present disclosure, so as to solve how to unify the mapping relationship between the bitmap of the MAC CE of the duplication activation/deactivation at the network side and that at the terminal side.

Figure 1:
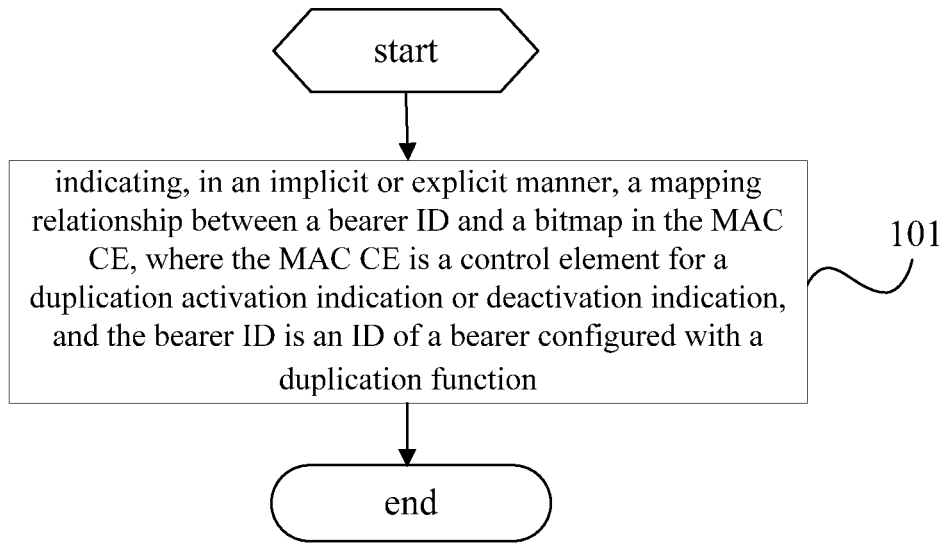
FIG. 1 is a first working flowchart of a bearer mapping method in an embodiment of the present disclosure.

As shown in FIG. 1, a bearer mapping method applied to a base station is provided in the present disclosure, including:

Step 101: indicating, in an implicit or explicit manner, a mapping relationship between a bearer ID and a bitmap in a media access control layer control element (MAC CE), where the MAC CE is a control element for a duplication activation indication or deactivation indication, and the bearer ID is an ID of a bearer configured with a duplication function.

Here, the MAC layer controls, in the form of MAC CE, the activation or deactivation of the duplication function of the bearer data packet. Specifically, the MAC layer carries, in the MAC CE, a bitmap indicating whether the bearer is activated or deactivated. The bits in the bitmap are in a one-to-one correspondence to the bearers configured with the duplication function. The UE side can determine, according to the "0" or "1" bit in the bitmap carried by the network side MAC CE, whether the corresponding duplication data packet of the bearer at the corresponding position need to be activated or deactivated, and inform the high layer of the result. The Packet Data Convergence Protocol (PDCP) layer may determine, based on the activated or deactivated state, the use and status of the corresponding radio link control RLC entity and the logical channel.

According to bearer mapping method in some embodiments of the present disclosure, a mapping relationship between a bearer ID and a bitmap in an MAC CE is indicated in an implicit or explicit manner, so that the terminal and the network side may determine the bearer represented by each bit in the bitmap, and then the terminal and the network side may determine clearly through the MAC CE the bearer needed to be activated or deactivated and the branch thereof.

Further, in some embodiments of the present disclosure, the indicating, in the implicit manner, the mapping relationship between the bearer ID and the bitmap in the MAC CE includes:

instructing, according to a preset protocol agreement, a terminal to sort the bearer IDs according to a preset sorting rule, to obtain a bearer ID sequence, and indicating a mapping relationship between each of the bearer IDs in the bearer ID sequence and the bitmap in the MAC CE.

The preset sorting rule includes: sorting according to a chronological order of bearer establishment or modification or sorting according to an ascending or descending order of the bearer IDs.

Further, the indicating the mapping relationship between each of the bearer IDs in the bearer ID sequence and the bitmap in the MAC CE includes:

instructing mapping N bearer IDs in the bearer ID sequence to N consecutive positions in the bitmap, where N is a positive integer, the bearer IDs are in a one-to-one correspondence to the positions in the bitmap.

Specifically, the method further includes: instructing mapping N bearer IDs in the bearer ID sequence to N consecutive positions in the bitmap in order, according to a present mapping rule;

the present mapping rule includes a mapping rule of mapping from a high bit to a low bit or a mapping rule of mapping from a low bit to a high bit.

In some embodiments of the present disclosure, in order to unify the mapping relationship between the bitmap of the MAC CE of the duplication activation/deactivation at the network side and that at the terminal side, the network side and the terminal side need to maintain a unified bearer ID sequence, and the network side may notify, through the bitmap mapping, the terminal side of the bearer ID that needs to be activated or deactivated. When the bearer ID sequence is mapped to the bitmap, the mapping may be performed from a high bit to a low bit or from a low bit to a high bit.

Further, subsequent to the indicating the mapping relationship between each of the bearer IDs in the bearer ID sequence and the bitmap in the MAC CE, the method further includes:

when establishing a new bearer, adding, according to a bearer ID of the new bearer and the preset sorting rule, the bearer ID of the new bearer at a corresponding position in the bearer ID sequence; and/or when releasing the bearer, cancelling the bearer ID of the bearer to be released from the bearer ID sequence; and/or when modifying the bearer, updating the bearer ID sequence according to the preset sorting rule.

In some embodiments of the present disclosure, the network side and the terminal side may implicitly establish and maintain the mapping relationship between the bearer and the bitmap according to the chronological order of the bearer establishment or modification or the size order of the bearer ID.

At this time, in the case that the bearer ID of the bearer is modified, the bearer ID sequence is updated according to the modified bearer ID and the preset sorting rule; in the case that the bearer ID of the bearer is not modified, the bearer ID sequence is updated according to the preset sorting rule.

The following specifically describes the establishment and maintenance of the above mapping relationship in an implicit manner in bearer establishment, modification and release scenarios.

In some embodiments of the present disclosure, an establishment of a new bearer refers to establishing a new bearer with a duplication function. Specifically, a new bearer with a duplication function can be established through a high-level signaling or the bearer without a duplication function is modified to a bearer with a duplication function. In some embodiments of the present disclosure, releasing a bearer refers to releasing a bearer with a duplication function. Specifically, a bearer with a duplication function can be released through a high-level signaling or a bearer with a duplication function is modified to a bearer without a duplication function. Modifying a bearer in the embodiment of the present disclosure refers to modifying a bearer with a duplication function.

(1) Sort According to Chronological Order of Bearer Establishment or Modification Sorting according to the order in which the bearers are established or modified, the bearer ID established or modified earliest is arranged at the forefront of the bearer ID sequence, or the bearer ID established or modified latest is arranged at the forefront of the bearer ID sequence. The network side and the UE side maintain uniformly the bearer ID sequence for the established bearer according to the same rule, namely the bearer established or modified firstly is arranged at the forefront of the bearer ID sequence, or the bearer established or modified latest is arranged at the forefront of the bearer ID sequence. For bearer establishment, modification or cancellation scenarios, the maintenance principle for the bearer ID sequence are as follows:

1.1. Establishing a New Bearer

For the newly established bearer, the ID of the newly established bearer is arranged at the forefront or the end of the bearer ID sequence according to the preset sorting rule determined above, so as to maintain the bearer sequence ID. If the bearer establishment fails, the original bearer ID sequence is maintained.

1.2. Releasing an Established Bearer

When the established bearer is released, the bearer ID is deleted from the bearer ID sequence, and the positions of the remaining bearer IDs are adjusted, the order of the remaining bearer IDs is maintained, and the continuity of the mapping positions is maintained.

1.3. Modifying an Established Bearer 1.31. For the Case where a Bearer ID of an Established Bearer is Modified, the Bearer ID Sequence May be Maintained in the Following Way:

The establishment time of the bearer is taken as the sorting standard, regardless of the modification time thereof, the old bearer ID is replaced with the new bearer ID in the bearer ID sequence, and the position of the bearer ID in the bearer ID sequence is maintained; or the sorting is performed according to the order of the modification time of the bearer, and the bearer ID sequence is maintained in a manner of releasing the original bearer to establish a new bearer. That is, the original bearer ID is deleted from the bearer ID sequence, and the new bearer ID is added to the corresponding position of the bearer ID sequence according to the principle of the new bearer according to the modification time of the new bearer ID.

1.32. For the Case where a Bearer ID of an Established Bearer is Modified and Other Configuration Thereof is not Modified, the Bearer ID Sequence May be Maintained in the Following Way:

The establishment time of the bearer is taken as the sorting standard, the bearer ID sequence is not processed, and the position of the bearer ID in the bearer ID sequence is maintained; or the sorting is performed according to the order of the modification time of the bearer, and the bearer ID sequence is maintained in a manner of releasing the original bearer to establish a new bearer. That is, the original bearer ID is deleted from the bearer ID sequence, and the new bearer ID is added to the bearer ID sequence according to the principle of the new bearer according to the modification time of the new bearer ID.

If the bearer modification fails and the bearer is not released, the original bearer ID sequence may be maintained or a new bearer ID sequence may be used in accordance with the modification principle. If the bearer modification fails and the bearer is released, the bearer ID sequence is updated according to the principle of releasing the established bearer in the above section 1.2.

In addition, a case where multiple bearers are established, modified, or released at the same time is specifically described below.

1.4. Establishing/Modifying Multiple Bearers at the Same Time

If the bearer establishment/modification list included in one high-layer signaling includes at two bearers establishment or modification cases, the processing is performed according to the order of the bears in the bearer establishment/modification list and in the processing manner of the above-mentioned bearer establishment scenario or bearer modification scenario. That is, the bearer at the forepart of the bearer establishment/modification list is preferentially added or modified to the bearer ID sequence according to the above processing method, or the bearer at the end of the bearer establishment/modification list is preferentially added or modified to the bearer ID sequence according to the above processing method.

1.5. Releasing Multiple Bearers Simultaneously

According to the order of the bearer release list, the bearers are processed and the bearer ID sequence is maintained according to the processing methods in the above bearer release scenario. The bearer at the forepart of the bearer release list is preferentially processed according to the processing method in the bearer release scenario, or the bearer at the end of the bearer release list is preferentially processed according to the processing method in the bearer release scenario.

1.6. Both the Bearer Establishment/Modification List and Bearer Release List Exist The bearer establishment/modification list may be preferentially processed according to the above principle of establishing/modifying multiple bearers simultaneously, and then the bear release list may be processed according to the above principle of releasing multiple bearers simultaneously, so as to maintain the bearer ID sequence. Alternatively, the bear release list may be preferentially processed according to the above principle of releasing multiple bearers simultaneously, and then the bearer establishment/modification list may be processed according to the above principle of establishing/modifying multiple bearers simultaneously, so as to maintain the bearer ID sequence.

(2) Maintaining the Bearer ID Sequence in an Ascending or Descending Order of the Bearer IDs That is, the ID sequence of the bearer is based on the order or reverse order of the IDs of the established bearers. For new bearers, the bearer ID of the newly established bearer and the bearer ID in the bearer sequence are added to the bearer ID sequence in ascending or descending order. For a released bearer, the bearer ID is deleted from the bearer ID sequence, while the order of the remaining bearer IDs is maintained. For a modified bearer, if the bearer ID is modified, the original ID is deleted from the bearer ID sequence according to the principle of releasing the bearer, the new ID is sorted according to the principle of the bearer establishment, and the order of increasing or decreasing of the bearer is maintained. If the ID is not modified, the original bearer ID sequence is maintained. For the bearer establishment, modification and release, the adjustment of the bearer ID sequence needs to maintain the continuity of the bearer mapping relationship, that is, mapping to several consecutive positions in the bitmap.

Further, the indicating, in the explicit manner, the mapping relationship between the bearer ID and the bitmap in the MAC CE includes:

indicating the mapping relationship between the bearer ID and the bitmap in the MAC CE through a high-layer signaling.

Here, the network side high layer indicates explicitly the mapping relationship between the bearer and the MAC layer bitmap through the bearer establishment or modification related signaling, and the terminal side and the network side establish and maintain the mapping relationship together.

Specifically, a mapping relationship between a bearer ID of a new bearer and the bitmap is carried in a bearer establishment instruction; and/or a mapping relationship between a bearer ID of a bearer to be released and the bitmap or the bearer ID of the bearer to be released or indication information indicating that the bearer does not have the duplication function is carried in a bearer releasing instruction; and/or a mapping relationship between a bearer ID of a modified bearer and the bitmap is carried in a bearer modification instruction.

The above-mentioned bearer creation instruction is used to establish a bearer with a duplication function or to modify a bearer without a duplication function to a bearer with a duplication function. The above-mentioned bearer release instruction is used to release a bearer with a duplication function or to modify a bearer with the duplication function to a bearer without a duplication function. The above indication information may be specifically implemented through explicit IE, the number of branches, invalid bitmap bits or no configuration. The above bearer modification instruction is used to modify a bearer with a duplication function.

In some embodiments of the present disclosure, in the process of establishing a bearer at a high layer, a new IE plaintext is added to indicate the index position of the bearer. The bearer ID and the index position are arranged in a one-to-one correspondence, the correspondence is assigned by the high layer, and the sequence is maintained by the high layer and the MAC.

The high layer may change the bearer ID and/or index position when the bearer is modified. The low layer adjusts the new mapping relationship between the bearer ID and the index position. If the index position of the bearer is modified, the mapping relationship between the bearer ID and the old index position is removed, and the old index position is set be available for the new bearer. If the bearer mapping relationship modification fails, the original bearer mapping relationship is maintained.

When a bearer is released, the low layer releases the mapping relationship between the released bearer and its index position, and this index position can be mapped with a new bearer. The index positions of the bearers allocated by the high layer may be discontinuous, that is, they can be mapped to discontinuous positions in the bitmap.

As the mapping relationship between the bearer and the bitmap may change during the establishment, modification or release of the bearer, the low layer is not allowed to activate or deactivate the bearer in the form of MAC CE during this process, otherwise the UE side and the network side may be inconsistent.

In the embodiment of the present disclosure, based on the different bearer attributes of the signaling bearer SRB and the data bearer DRB, the two bearer types may require different management methods. Therefore, in order to clearly distinguish the DRB and SRB at the MAC layer, the highest bit from the bitmap may be specified. Starting continuous N-bit mapping is an SRB bearer, and it may also be provided that continuous N-bit mapping is started from the lower bit of the bitmap as an SRB bearer, where N is determined according to the number of SRBs that can be established. The usage rules of SRB can be different from DRB. The above bearer ID implicit mapping methods are applicable to the establishment and maintenance of the bearer ID mapping relationship of DRB and SRB respectively. The explicit mapping method high-level signaling explicit identification maps to a position in the bearer ID sequence, which can be a bitmap absolute position. The high layer will allocate the positions carried by SRB and DRB according to the reserved bits of SRB. It may also be the relative position for the starting position of SRB or DRB.

In the bearer mapping method in some embodiments of the present disclosure, the network side and the UE side may together address the bearers that need to be activated or deactivated through the bearer ID sequence which is maintained together with the MAC layer and through the bitmap.

At this time, in the bearer mapping method in some embodiments of the present disclosure, after the foregoing step 101, the method further includes:

in the case that a preset operation is performed on a target branch of a target bearer and the target bearer is enabled to be configured with at least two branches where the preset operation is enabled to be performed, sending, to a terminal, a first mapping relationship between a bearer ID of the target bearer and the bitmap and a second mapping relationship between a branch ID of each target branch and the bitmap.

The preset operation here may be specifically an activation operation or a deactivation operation. The first mapping relationship and the second mapping relationship are sent to a terminal, so that the terminal may perform, according to the first mapping relationship and the second mapping relationship, an activation operation or a deactivation operation on a target branch of the target bearer.

It should be noted that, in the case that each bearer may be only configured with two branches at most, if a main branch and an auxiliary branch are distinguished and the main branch cannot be modified through the MAC CE and only the auxiliary branch can be activated or deactivated, when the activation or deactivation is performed, the MAC does not need to provide other information in addition to the addressing bearer, and both the UE side and the network side can identify the branch of which the bearer needs to be activated or deactivated.

In the case that each bearer may be only configured with two branches at most, if a main branch and an auxiliary branch are not distinguished and the two branches are equal, when the activation or deactivation are performed on the main branch and the auxiliary branch, the base station needs to provide information in addition to the addressing bearer for addressing.

In the case that each bearer may be configured with more than two branches and a main branch and an auxiliary branch are distinguished, when the activation or deactivation are performed on the auxiliary branch, the base station needs to provide information in addition to the addressing bearer; in the case that a main branch and an auxiliary branch are not distinguished, when the activation or deactivation are performed on all auxiliary branches, the base station needs to provide information in addition to the addressing bearer for addressing.

When the base station provides information in addition to the addressing bearer to address the branch information that needs to be activated or deactivated and to be performed with other behaviors, it can be implemented by using an additional bitmap in MAC CE. It is used in conjunction with the bitmap indicating the bearer ID in MAC CE to notify the UE side of one or more branches of the bearer needs to be activated or deactivated (or other behaviors). In order to unify the correspondence of the branches between the network side and the UE side, the logical channel ID of the branch or other identifier that can represent the branch that can be activated or deactivated is provided to the low layer MAC in order when the bearer is configured at the high layer, and then the MAC corresponds the same in this order to the bitmap from a high bit to a low bit or from a low bit to a high bit to bitmap or uses the form of index to mark the branches. Alternatively, the logical channel ID of each branch or other identifiers that can indicate the branch is mapped to the bitmap or index in order or in a reverse order. When activating or deactivating the bearer, the network side may carry the mapping relationship of the above bearer ID through MAC CE, and at the same time carry the mapping relationship of the branch ID that assists the bearer, so as to notify the UE side of the branch and the bearer needs to be activated or deactivated (or other behaviors).

In addition, in the case that it is needed to distinguish the main branch and the auxiliary branch, if the logical channel ID of the main branch or another identifier identifying the branch is the default configuration, the higher-level configuration may carry only the logical channel ID of the auxiliary branch or other identifiers that can identify the branch. If the logical channel ID of the main branch or other identifiers that identify the branch is configured at a high layer, when the network side performs the configuration, the identifier of the main branch and the identifier of the auxiliary branch may be carried separately in two IEs, or first identifier or the last identifier carried of all the identifiers is a main branch identifier.

According to the present disclosure, a mapping relationship between a bearer ID and a bitmap in an MAC CE is indicated in an implicit or explicit manner, so that the terminal and the network side may determine the bearer represented by each bit in the bitmap, and then the terminal and the network side may determine clearly through the MAC CE the bearer needed to be activated or deactivated and the branch thereof.

Specific application examples of the present disclosure are described below.

In some embodiments of the present disclosure, an establishment of a new bearer refers to establishing a new bearer with a duplication function. Specifically, a new bearer with a duplication function can be established through a high-level signaling or the bearer without a duplication function is modified to a bearer with a duplication function. In some embodiments of the present disclosure, releasing a bearer refers to releasing a bearer with a duplication function. Specifically, a bearer with a duplication function can be released through a high-level signaling or a bearer with a duplication function is modified to a bearer without a duplication function. Modifying a bearer in the embodiment of the present disclosure refers to modifying a bearer with a duplication function.

Embodiment 1: When a New Bearer is Established, a Mapping Relationship is Maintained Based on the Bearer Establishment Order.

Assuming that a bearer ID sequence already exists, the bearer ID sequence may be specifically $RB_1$, $RB_2$, ..., $RB_{k-1}$, $RB_k$, $RB_{k+1}$, ..., $RB_n$. If the newly established bearer is $RB_{n+1}$, and the ordering principle is that the newly established bearers are arranged at the end of the sequence, the bearer sequence will be updated to $RB_1$, $RB_2$, ..., $RB_{k-1}$, $RB_k$, $RB_{k+1}$, ..., $RB_n$, $RB_{n+1}$.

Embodiment 2: When a Bearer is Released, a Mapping Relationship is Maintained Based on the Bearer Establishment Order.

Assuming that a bearer ID sequence already exists, the bearer ID sequence may be specifically $RB_1$, $RB_2$, ..., $RB_{k-1}$, $RB_k$, $RB_{k+1}$, ..., $RB_n$. The released bearer is $RB_k$, then the bearer ID is deleted from the bearer ID sequence, and the new bearer ID sequence is adjusted to $RB_1$, $RB_2$, ..., $RB_{k-1}$, $RB_{k+1}$, ..., $RB_n$.

Embodiment 3: When a Bearer is Modified, a Mapping Relationship is Maintained Based on the Bearer Establishment Order.

Assuming that a bearer ID sequence already exists, the bearer ID sequence may be specifically $RB_1$, $RB_2$, ..., $RB_{k-1}$, $RB_k$, $RB_{k+1}$, ..., $RB_n$. The modified bearer is $RB_k$. If the time of the establishment of the bearer is used as the ordering principle, regardless of the modification time, if the bearer ID has not changed, the sequence of the bearer will still be $RB_1$, $RB_2$, ..., $RB_{k-1}$, $RB_k$, $RB_{k+1}$, ..., $RB_n$. If the bearer ID changes, the bearer sequence will be modified to $RB_1$, $RB_2$, ..., $RB_{k-1}$, $RB_{k'}$, $RB_{k+1}$, ..., $RB_n$, that is, the original $RB_k$ has become $RB_{k'}$, but the position of the bearer has not changed.

The modified bearer is $RB_k$. If the modification time of the bearer is used as the ranking principle and the bearer ID has not changed, the new bearer sequence will become $RB_1$, $RB_2$, ..., $RB_{k-1}$, $RB_{k+1}$, ..., $RB_n$, $RB_k$ or $RB_k$, $RB_1$, $RB_2$, ..., $RB_{k-1}$, $RB_{k+1}$, ..., $RB_n$, the principle is the same as that of the first embodiment. If the bearer ID changes and the bearer ID is changed from $RB_k$ to $RB_{k'}$, the new bearer ID sequence will become $RB_1$, $RB_2$, ..., $RB_{k-1}$, $RB_{k+1}$, ... $RB_n$, $RB_{k'}$ or $RB_{k'}$, $RB_1$, $RB_2$, ..., $RB_{k-1}$, $RB_{k+1}$, ... $RB_n$, the principle is the same as that of the first embodiment.

Embodiment 4: When a New Bearer is Established, the Mapping Relationship is Maintained Based on the Size of the Bearer ID Assuming that a bearer ID sequence already exists, the bearer ID sequence may be specifically $RB_1$, $RB_2$, ..., $RB_{k-1}$, $RB_k$, $RB_{k+1}$, ..., $RB_n$. The new bearer is $RB_{n+1}$. If the bearer ID is sorted in ascending order, and the new bearer ID is ID $RB_{n+1} > RB_k$ and $RB_{n+1} < RB_{k+1}$, the new bearer ID sequence will be adjusted to $RB_1$, $RB_2$, ..., $RB_{k-1}$, $RB_k$, $RB_{n+1}$, $RB_{k+1}$, ... $RB_n$. If the bearer ID is in descending order, and a new bearer ID $RB_{n+1} < RB_k$ and $RB_{n+1} > RB_{k+1}$ is established, the new bearer ID sequence will be adjusted to $RB_1$, $RB_2$, ..., $RB_{k-1}$, $RB_k$, $RB_{n+1}$, $RB_{k+1}$, ... $RB_n$.

Embodiment 5: When the Bearer is Released, the Mapping Relationship is Maintained Based on the Size of the Bearer ID Assuming that a bearer ID sequence already exists, the bearer ID sequence may be specifically $RB_1$, $RB_2$, ..., $RB_{k-1}$, $RB_k$, $RB_{k+1}$, ..., $RB_n$. The released bearer is $RB_k$, and the new bearer ID sequence is adjusted to $RB_1$, $RB_2$, ..., $RB_{k-1}$, $RB_{k+1}$, ..., $RB_n$.

Embodiment 6: When the Bearer is Modified, the Mapping Relationship is Maintained Based on the Size of the Bearer ID Assuming that a bearer ID sequence already exists, the bearer ID sequence may be specifically $RB_1$, $RB_2$, ..., $RB_{k-1}$, $RB_k$, $RB_{k+1}$, ..., $RB_n$. The modified bearer is $RB_k$. If the bearer ID has not been modified, the bearer ID sequence has not changed. If the bearer ID is modified, the new bearer ID is $RB_{k'}$. If the bearer ID sequence is sorted in ascending order, and the new bearer ID $RB_{k'} > RB_m$, $RB_{k'} < RB_{m+1}$, then the new bearer ID sequence is adjusted to $RB_1$, $RB_2$, ..., $RB_{k-1}$, $RB_{k+1}$, ..., $RB_m$, $RB_{k'}$, $RB_{m+1}$, ..., $RB_n$. $RB_m$ may be less than or equal to $RB_{k-1}$. If the bearer ID sequence is in descending order and the new bearer ID $RB_{k'} < RB_1$ and $RB_{k'} > RB_{m+1}$, the new bearer ID sequence is adjusted to $RB_1$, $RB_2$, ..., $RB_{k-1}$, $RB_{k+1}$, ..., $RB_m$, $RB_{k'}$, $RB_{m+1}$, ..., $RB_n$. $RB_m$ may be less than or equal to $RB_{k-1}$.

Embodiment 7: When a New Bearer is Established, the Position of the Bearer in the Bearer ID Sequence is Identified Based on the High Layer Display.

Assuming that a bearer ID sequence already exists, the bearer ID sequence may be specifically $RB_1$, $RB_2$, ..., $RB_{k-1}$, $RB_k$, $RB_{k+1}$, ..., $RB_n$. The corresponding index positions of each bearer are $p_1$, $p_2$, ..., $p_{k-1}$, $p_k$, $p_{k+1}$, ..., $p_n$, respectively. Among them, $_1$, $p_2$, ..., $p_{k-1}$, $p_k$, $p_{k+1}$, ..., $p_n$ may be bit positions corresponding to the bitmap, and may be discontinuous.

If the newly established bearer is $RB_{n+1}$, the high layer instructs to establish the new bearer, and configures the index position of the bearer carried in the bearer establishment message to be $p_{n+1}$, where $p_{n+1}$ is not equal to any of the existing positions mentioned above. Then the bearer ID corresponding to the $p_{n+1}$ bit of the bitmap is $RB_{n+1}$.

If the newly established bearer is $RB_{n+1}$, the bearer is modified from a non-duplication function bearer to a duplication function bearer, and the index position of the bearer carried by the high layer when the message is configured is $p_{n+1}$, where $p_{n+1}$ is not equal to any of the above existing position. Then the bearer ID corresponding to the $p_{n+1}$ bit of the bitmap is $RB_{n+1}$.

Embodiment 8: When the Bearer is Released, the Position of the Bearer in the Bearer ID Sequence is Identified Based on the High Layer Display.

Assuming that a bearer ID sequence already exists, the bearer ID sequence may be specifically $RB_1$, $RB_2$, ..., $RB_{k-1}$, $RB_k$, $RB_{k+1}$, ..., $RB_n$. The corresponding index positions of each bearer are $p_1$, $p_2$, ..., $p_{k-1}$, $p_k$, $p_{k+1}$, ..., $p_n$, respectively. Among them, $p_1$, $p_2$, ..., $p_{k-1}$, $p_k$, $p_{k+1}$, ..., $p_n$ may be bit positions corresponding to the bitmap, and may be discontinuous.

If the released bearer is $RB_k$, the high layer instructs to release the bearer, then the mapping relationship between the bearer $RB_k$ and the original $p_k$ position is released, and the $p_k$ position can be used to remap the new bearer.

If the released bearer is $RB_k$, the high layer instructs that the bearer be modified from a duplication function bearer to a non-duplication bearer, then the bearer is deleted from the bearer ID sequence, the mapping relationship between the bearer $RB_k$ and the original pk position is released, and the $p_k$ position can be used to remap new bearers.

Embodiment 9: When the Bearer is Modified, the Position of the Bearer in the Bearer ID Sequence is Identified Based on the High Layer Display.

Assuming that a bearer ID sequence already exists, the bearer ID sequence may be specifically $RB_1$, $RB_2$, ..., $RB_{k-1}$, $RB_k$, $RB_{k+1}$, ..., $RB_n$. The corresponding index positions of each bearer are $p_1, p_2, \ldots, p_{k-1}, p_k, p_{k+1}, \ldots, p_n$, respectively. Among them, $p_1, p_2, \ldots, p_{k-1}, p_k, p_{k+1}, \ldots, p_n$ may be bit positions corresponding to the bitmap, and may be discontinuous.

If the modified bearer is $RB_k$, when the bearer modifies the bearer to modify the signaling, the index position of the bearer is modified to $p_{k'}$, where $p_{k'}$ is not equal to any of the existing positions mentioned above. Then the bearer ID corresponding to the $p_{k'}$ bit of the bitmap is the ID of the $RB_k$, and the mapping relationship between the bearer $RB_k$ and the original $p_{k'}$ position is released, and the $p_k$ position can be used to remap a new bearer.

If the modified bearer is $RB_k$ and the bearer ID is changed from the original ID to K', the bearer ID corresponding to the $p_k$ bit of the bitmap is updated to K'.

If the modified bearer is RBk, its bearer ID is changed from the original ID to K', and the index position of the bearer is changed from $p_k$ to $p_{k'}$, where $p_{k'}$ is not equal to any of the existing positions mentioned above, the bearer ID corresponding to the bitmap $p_{k'}$ bit is K', and the mapping relationship between the bearer $RB_k$ and the original $p_k$ position is released, and the $p_k$ position can be used to remap the new bearer.

If the bearer modification signaling does not include the modification of the bearer ID and the index position, the original bearer ID mapping relationship is maintained.

Embodiment 10: DRB Bearer Activation or Deactivation Behavior (Single Controllable Branch Scenario)

The above embodiments 1-9 complete the position mapping between the bearer ID and the bitmap, where bitmap positions 0–(N–1) are reserved SRB bearer mappings, and the remaining bearers are DRB bearer mappings, where the bitmap position N-max bit (max is the size of the highest bit position of the bitmap) has already k positions mapped to bear in the bits. The k positions are $p_0, p_1, \ldots, p_m, \ldots, p_k$, respectively. The position can be continuous or discontinuous, and the remaining positions are not mapped by the bearer, k positions are mapped to $DRB_0, DRB_1, \ldots, DRB_m, \ldots, DRB_k$, respectively.

Step 1: If the bearer that needs to be activated is $DRB_m$, and the bitmap position is '1', this position bearer needs to be activated. At this time, the network side sets the $p_m$ position of the corresponding bitmap in MAC CE to 1, and sends the message to the UE side.

Step 2: the UE side MAC layer detects that the $p_m$ position in the bitmap is set to 1 through MAC CE. It is learned that the bearer corresponding to this position needs to be activated, and by judging that $p_m$ does not belong to the domain [0, N−1], it is known that the bearer is DRB. The bearer is determined to be $DRB_m$ by matching the bearer ID mapping relationship.

Step 3: the UE side MAC layer informs the high layer of the obtained bearer information that needs to be activated. After PDCP obtains this information, it activates the bearer according to the activation condition of the bearer, and controls the use of the activated RLC entity and logical channel for data duplication.

In addition, based on the above steps 1 to 3, deactivation can also be implemented. The MAC layer on the UE side informs the high layer of the obtained bearer information that needs to be deactivated. After PDCP obtains this information, it deactivates according to the bearer activation status, controls to stop using the corresponding RLC entity and logical channel, and ends the data duplication of the branch.

Embodiment 11: Only One Branch can be Configured for Each Bearer for Activation or Deactivation Behavior It is assumed that the bearers $RB_1, RB_2, \ldots, RB_{k-1}, RB_k, RB_{k+1}, \ldots, RB_n$ are established, and the mapping relationships between all bearer IDs and bitmaps have been obtained according to the above embodiment 1-9, and each bearer corresponds to the position $p_1, p_2, \ldots, p_{k-1}, p_k, p_{k+1}, \ldots, p_n$ in the bitmap.

If the network side notifies through the MAC CE the UE that the $RB_k$ branch needs to be activated, and the corresponding bitmap position is '1' indicating that the position bearer needs to be activated, the $p_k$ position corresponding to the bitmap is set to 1. The bitmap pk position in the MAC CE unit sent by the UE through the network side is 1, and it can be determined that the bearer that needs to be activated is $RB_k$.

The UE-side MAC layer obtains duplication activation/deactivation MAC CE bitmap pk position through MAC CE. The mapping relationship between the bearer ID and the bitmap indicates that RBk needs to be activated, and the obtained bearer needs to be activated. The information informs the high layers that after PDCP obtains this information, it controls the use of the activated RLC entity and logical channel for duplication of data according to the activation of the bearer.

Embodiment 12: Each Bearer has at Least One Branch can be Activated or Deactivated.

It is assumed that the bearers $RB_1, RB_2, \ldots, RB_{k-1}, RB_k, RB_{k+1}, \ldots, RB_n$ have been obtained, and the mapping relationships between all bearer IDs and bitmaps have been obtained according to the above embodiment 1-9, and each bearer corresponds to the positions $p_1, p_2, \ldots, p_{k-1}, p_k, p_{k+1}, \ldots, p_n$ in the bitmap.

If the network side notifies the UE that the branch m of the RBk needs to be activated through the MAC CE, and the corresponding bitmap position is '1' indicating that the position bearer needs to be activated, the pk position corresponding to the bitmap is set to 1.

When the high layer establishes all branches through a signaling when configuring the bear $RB_k$, the branch IDs in the list are in an order of $leg_0, leg_1, \ldots, leg_m, \ldots, leg_s$.

If each branch is arranged in a list order, it can be arranged in order or in reverse order. After sorting, the positions corresponding to the bitmap are $P_1, P_2, \ldots, P_m, \ldots, P_s$, then the $P_m$ position in the bitmap in the auxiliary information is set to '1'. If each branch is arranged according to the size of the identifier, it can be arranged in order or in reverse order. After sorting, the positions corresponding to the bitmap are $P_1, P_2, \ldots, P_m, \ldots, P_s$, then the $P_m$ position in the bitmap in the auxiliary information is set to '1'.

The network side sends the set MAC CE to the UE side. The $p_k$ position of the bitmap in the MAC CE unit sent by the UE through the network side is 1, and the bearer that needs to be activated is determined to be $RB_k$ through the mapping relationship between the bearer and the bitmap. The $P_m$ position of the bitmap in the auxiliary information is '1', and the branch to be activated is m. The MAC layer will report the bearer needed to be activated and the corresponding branch to the high layer. PDCP controls the corresponding RLC entity and logical channel that use the bearer and corresponding to the branch according to the information of the bearer and the branch that needs to be activated reported by the MAC layer.

In addition, the deactivation can also be achieved through the above steps, which will not be described in detail here.

The bearer mapping method in the embodiment of the present disclosure proposes a branch mapping method and a maintenance method for a multi-branch scenario, so that the network side and the UE side can clearly identify the bearers and the branches thereof that need to be activated or deactivated through MAC CE.

Figure 2:
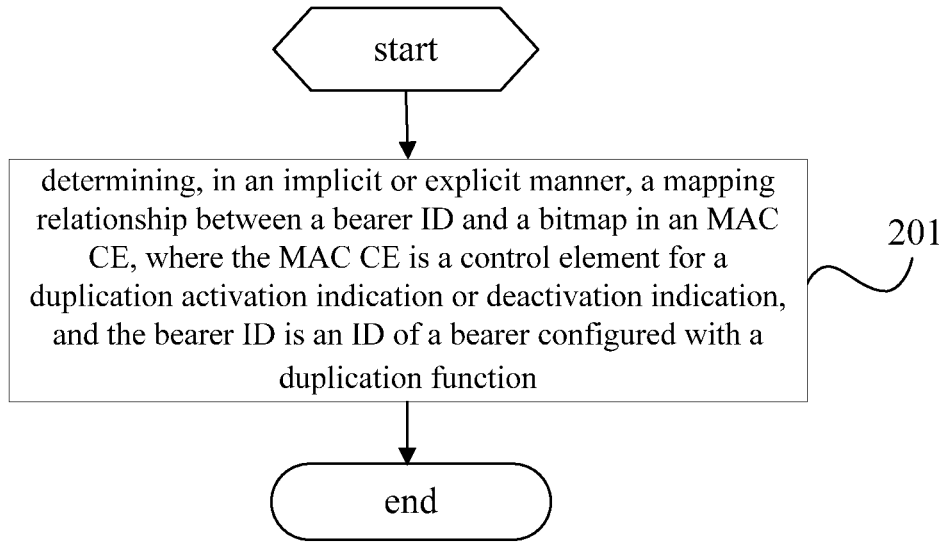
FIG. 2 is a second working flowchart of a bearer mapping method in an embodiment of the present disclosure.

A bearer mapping method is further provided in some embodiments of the present disclosure, which is applied to a terminal. As shown in FIG. 2, the method includes:

Step 201: determining, in an implicit or explicit manner, a mapping relationship between a bearer ID and a bitmap in a media access control layer control element (MAC CE), where the MAC CE is a control element for a duplication activation indication or deactivation indication, and the bearer ID is an ID of a bearer configured with a duplication function.

Here, the MAC layer controls, in the form of MAC CE, the activation or deactivation of the duplication function of the bearer data packet. Specifically, the MAC layer carries, in the MAC CE, a bitmap indicating whether the bearer is activated or deactivated. The bits in the bitmap are in a one-to-one correspondence to the bearers configured with the duplication function. The UE side can determine, according to the "0" or "1" bit in the bitmap carried by the network side MAC CE, whether the corresponding duplication data packet of the bearer at the corresponding position need to be activated or deactivated, and inform the high layer of the result. The Packet Data Convergence Protocol (PDCP) layer may determine, based on the activated or deactivated state, the use and status of the corresponding radio link control RLC entity and the logical channel.

According to bearer mapping method in some embodiments of the present disclosure, a mapping relationship between a bearer ID and a bitmap in an MAC CE is indicated in an implicit or explicit manner, so that the terminal and the network side may determine the bearer represented by each bit in the bitmap, and then the terminal and the network side may determine clearly through the MAC CE the bearer needed to be activated or deactivated and the branch thereof.

Further, the determining, in the implicit manner, the mapping relationship between the bearer ID and the bitmap in the MAC CE includes:

sorting the bearer IDs according to a preset sorting rule according to a preset protocol agreement, to obtain a bearer ID sequence, and indicating a mapping relationship between each of the bearer IDs in the bearer ID sequence and the bitmap in the MAC CE.

Optionally, the preset sorting rule includes: sorting according to a chronological order of bearer establishment or modification or sorting according to an ascending or descending order of the bearer IDs.

Further, the determining the mapping relationship between each of the bearer IDs in the bearer ID sequence and the bitmap in the MAC CE includes:

mapping N bearer IDs in the bearer ID sequence to N consecutive positions in the bitmap, where N is a positive integer, the bearer IDs are in a one-to-one correspondence to the positions in the bitmap.

Optionally, the mapping N bearer IDs in the bearer ID sequence to N consecutive positions in the bitmap includes:

mapping N bearer IDs in the bearer ID sequence to N consecutive positions in the bitmap in order, according to a present mapping rule;

the present mapping rule includes a mapping rule of mapping from a high bit to a low bit or a mapping rule of mapping from a low bit to a high bit.

In some embodiments of the present disclosure, in order to unify the mapping relationship between the bitmap of the MAC CE of the duplication activation/deactivation at the network side and that at the terminal side, the network side and the terminal side need to maintain a unified bearer ID sequence, and the network side may notify, through the bitmap mapping, the terminal side of the bearer ID that needs to be activated or deactivated. When the bearer ID sequence is mapped to the bitmap, the mapping may be performed from a high bit to a low bit or from a low bit to a high bit.

Further, subsequent to the determine the mapping relationship between each of the bearer IDs in the bearer ID sequence and the bitmap in the MAC CE, the method further includes:

when establishing a new bearer, adding, according to a bearer ID of the new bearer and the preset sorting rule, the bearer ID of the new bearer at a corresponding position in the bearer ID sequence; and/or when releasing the bearer, cancelling the bearer ID of the bearer to be released from the bearer ID sequence; and/or when modifying the bearer, updating the bearer ID sequence according to the preset sorting rule.

Optionally, the when modifying the bearer, updating the bearer ID sequence according to the preset sorting rule includes: in the case that the bearer ID of the bearer is modified, updating the bearer ID sequence according to the modified bearer ID and the preset sorting rule; in the case that the bearer ID of the bearer is not modified, updating the bearer ID sequence according to the preset sorting rule.

Further, the determining, in the explicit manner, the mapping relationship between the bearer ID and the bitmap in the MAC CE includes:

determining the mapping relationship between the bearer ID and the bitmap in the MAC CE through a high-layer signaling.

Further, the determining the mapping relationship between the bearer ID and the bitmap in the MAC CE through the high-layer signaling includes:

determining, according to a bearer establishment instruction, a mapping relationship between a bearer ID of a new bearer and the bitmap, where the bearer establishment instruction carries the mapping relationship between the bearer ID of the new bearer and the bitmap; and/or releasing, according to a bearer releasing instruction, a mapping relationship between a bearer ID of a bearer to be released and the bitmap, where the bearer releasing instruction carries the mapping relationship between the bearer ID of the bearer to be released and the bitmap or the bearer ID of the bearer to be released or indication information indicating that the bearer does not have the duplication function; and/or determining, according to a bearer modification instruction, a mapping relationship between a bearer ID of a modified bearer and the bitmap, where the bearer modification instruction carries the mapping relationship between the bearer ID of the modified bearer and the bitmap.

Further, the bearer mapping method further includes:

receiving a first mapping relationship and a second mapping relationship sent by the base station, where the first mapping relationship is a mapping relationship between a bearer ID of a target bearer and the bitmap, and the second mapping relationship is a mapping relationship between a target branch of the target bearer and the bitmap, and the first mapping relationship and the second mapping relationship are sent in the case that the base station performs a preset operation on the target branch of the target bearer and the target bearer is enabled to be configured with at least two branches where the preset operation is enabled to be performed;

performing the preset operation on the target branch of the target bearer according to the first mapping relationship and the second mapping relationship The preset operation here may be specifically an activation operation or a deactivation operation. The first mapping relationship and the second mapping relationship are sent to a terminal, so that the terminal may perform, according to the first mapping relationship and the second mapping relationship, an activation operation or a deactivation operation on a target branch of the target bearer.

According to the present disclosure, a mapping relationship between a bearer ID and a bitmap in an MAC CE is indicated in an implicit or explicit manner, so that the terminal and the network side may determine the bearer represented by each bit in the bitmap, and then the terminal and the network side may determine clearly through the MAC CE the bearer needed to be activated or deactivated and the branch thereof.

Figure 3:
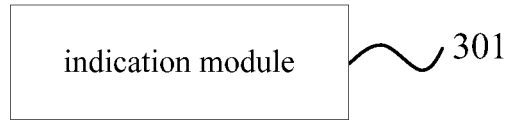
FIG. 3 is a schematic diagram of a first module of a bearer mapping device in an embodiment of the present disclosure.

As shown in FIG. 3, a bearer mapping device applied to a base station is further provided in an embodiment of the present disclosure, including:

an indication module 301, configured to indicate, in an implicit or explicit manner, a mapping relationship between a bearer ID and a bitmap in a media access control layer control element (MAC CE), where the MAC CE is a control element for a duplication activation indication or deactivation indication, and the bearer ID is an ID of a bearer configured with a duplication function.

Optionally, the indication module 301 is configured to:

instruct, according to a preset protocol agreement, a terminal to sort the bearer IDs according to a preset sorting rule, to obtain a bearer ID sequence, and indicate a mapping relationship between each of the bearer IDs in the bearer ID sequence and the bitmap in the MAC CE.

Optionally, the preset sorting rule includes: sorting according to a chronological order of bearer establishment or modification or sorting according to an ascending or descending order of the bearer IDs.

Optionally, the indication module 301 is configured to:

instruct mapping N bearer IDs in the bearer ID sequence to N consecutive positions in the bitmap, where N is a positive integer, the bearer IDs are in a one-to-one correspondence to the positions in the bitmap.

Optionally, the indication module 301 is configured to:

instruct mapping N bearer IDs in the bearer ID sequence to N consecutive positions in the bitmap in order, according to a present mapping rule;

the present mapping rule includes a mapping rule of mapping from a high bit to a low bit or a mapping rule of mapping from a low bit to a high bit.

Figure 4:
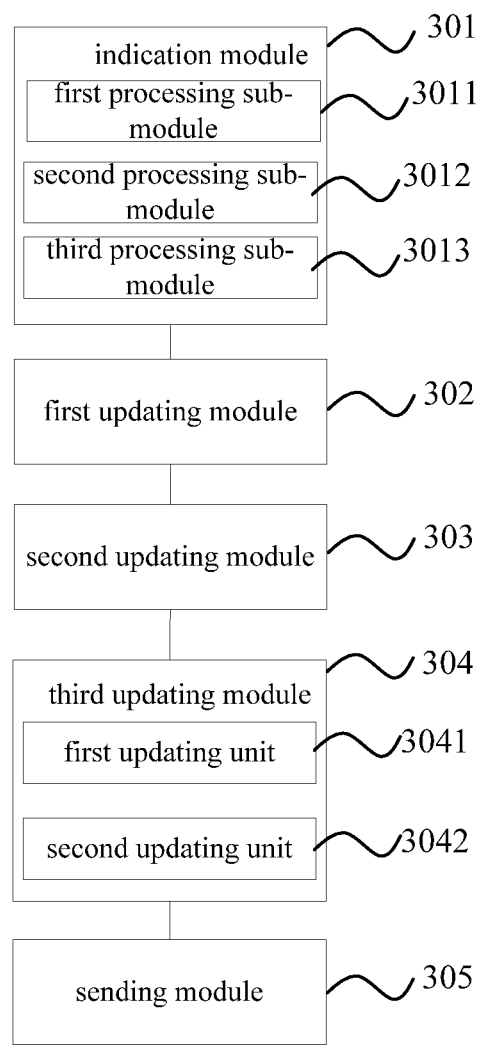
FIG. 4 is a schematic diagram of a second module of a bearer mapping device in an embodiment of the present disclosure.

Optionally, as shown in FIG. 4, the bearer mapping device further includes:

a first updating module 302, configured to, when establishing a new bearer, add, according to a bearer ID of the new bearer and the preset sorting rule, the bearer ID of the new bearer at a corresponding position in the bearer ID sequence; and/or a second updating module 303, configured to, when releasing the bearer, cancel the bearer ID of the bearer to be released from the bearer ID sequence; and/or a third updating module 304, configured to, when modifying the bearer, update the bearer ID sequence according to the preset sorting rule.

Optionally, the third updating module 304 includes:

a first updating unit 3041, configured to, in the case that the bearer ID of the bearer is modified, update the bearer ID sequence according to the modified bearer ID and the preset sorting rule;

a second updating unit 3042, configured to, in the case that the bearer ID of the bearer is not modified, update the bearer ID sequence according to the preset sorting rule.

Optionally, the indication module 301 is configured to: indicate the mapping relationship between the bearer ID and the bitmap in the MAC CE through a high-layer signaling.

Optionally, the indication module 301 comprises:

a first processing sub-module 3011, configured to, carry, in a bearer establishment instruction, a mapping relationship between a bearer ID of a new bearer and the bitmap; and/or a second processing sub-module 3012, configured to, carry, in a bearer releasing instruction, a mapping relationship between a bearer ID of a bearer to be released and the bitmap or the bearer ID of the bearer to be released or indication information indicating that the bearer does not have the duplication function; and/or a third processing sub-module 3013, configured to, carry, in a bearer modification instruction, a mapping relationship between a bearer ID of a modified bearer and the bitmap.

Optionally, the bearer mapping device further includes:

a sending module 305, configured to, in the case that a preset operation is performed on a target branch of a target bearer and the target bearer is enabled to be configured with at least two branches where the preset operation is enabled to be performed, send, to a terminal, a first mapping relationship between a bearer ID of the target bearer and the bitmap and a second mapping relationship between a branch ID of each target branch and the bitmap.

According to the bearer mapping device in some embodiments of the present disclosure, a mapping relationship between a bearer ID and a bitmap in an MAC CE is indicated in an implicit or explicit manner, so that the terminal and the network side may determine the bearer represented by each bit in the bitmap, and then the terminal and the network side may determine clearly through the MAC CE the bearer needed to be activated or deactivated and the branch thereof.

It should be noted that this device is a device corresponding to the above method embodiment, and all implementation manners in the above method embodiment are applicable to the embodiment of the device, and can also achieve the same technical effect.

Figure 5:
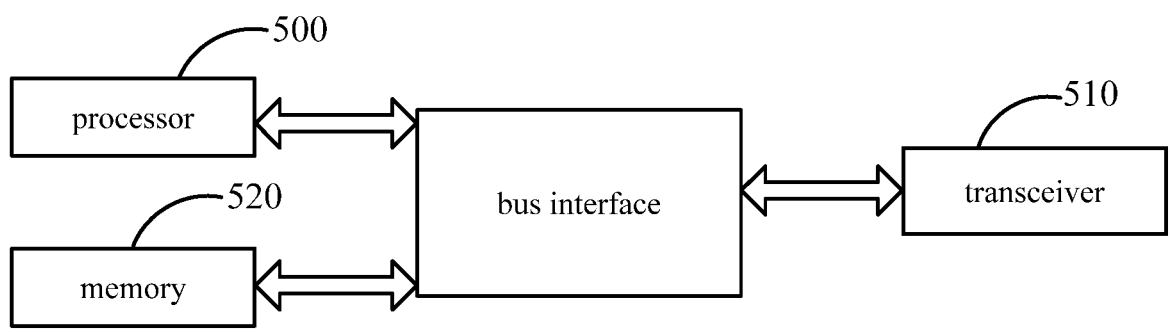
FIG. 5 is a structural block diagram of a base station in an embodiment of the present disclosure.

As shown in FIG. 5, a base station is further provided in an embodiment of the present disclosure, including a memory 520, a processor 500, a transceiver 510, a bus interface, and a computer program stored in the memory 520 and executable on the processor 500. The processor 500 is configured to read a program in the memory 520 to perform:

indicate, in an implicit or explicit manner, a mapping relationship between a bearer ID and a bitmap in a media access control layer control element (MAC CE), where the MAC CE is a control element for a duplication activation indication or deactivation indication, and the bearer ID is an ID of a bearer configured with a duplication function.

As shown in FIG. 5, the bus architecture may include any number of interconnected buses and bridges. Specifically, one or more processors represented by the processor 500 and various circuits of the memory represented by the memory 520 are linked together. The bus architecture can also link various other circuits such as peripherals, voltage regulators, and power management circuits, which are well known in the art, so they are not described further herein. The bus interface provides an interface. The transceiver 510 may be multiple elements, including a transmitter and a transceiver, providing a unit for communicating with various other devices over a transmission medium. The processor 500 is responsible for managing the bus architecture and general processing, and the memory 520 may store data used by the processor 500 when performing operations.

The processor 500 is further configured to read the computer program to:

instruct, according to a preset protocol agreement, a terminal to sort the bearer IDs according to a preset sorting rule, to obtain a bearer ID sequence, and indicate a mapping relationship between each of the bearer IDs in the bearer ID sequence and the bitmap in the MAC CE.

Optionally, the preset sorting rule includes: sorting according to a chronological order of bearer establishment or modification or sorting according to an ascending or descending order of the bearer IDs.

The processor 500 is further configured to read the computer program to:

instruct mapping N bearer IDs in the bearer ID sequence to N consecutive positions in the bitmap, where N is a positive integer, the bearer IDs are in a one-to-one correspondence to the positions in the bitmap.

The processor 500 is further configured to read the computer program to:

instruct mapping N bearer IDs in the bearer ID sequence to N consecutive positions in the bitmap in order, according to a present mapping rule;

the present mapping rule includes a mapping rule of mapping from a high bit to a low bit or a mapping rule of mapping from a low bit to a high bit.

The processor 500 is further configured to read the computer program to:

when establishing a new bearer, add, according to a bearer ID of the new bearer and the preset sorting rule, the bearer ID of the new bearer at a corresponding position in the bearer ID sequence; and/or when releasing the bearer, cancel the bearer ID of the bearer to be released from the bearer ID sequence; and/or when modifying the bearer, update the bearer ID sequence according to the preset sorting rule.

The processor 500 is further configured to read the computer program to:

in the case that the bearer ID of the bearer is modified, update the bearer ID sequence according to the modified bearer ID and the preset sorting rule;

in the case that the bearer ID of the bearer is not modified, update the bearer ID sequence according to the preset sorting rule.

The processor 500 is further configured to read the computer program to:

indicate the mapping relationship between the bearer ID and the bitmap in the MAC CE through a high-layer signaling.

The processor 500 is further configured to read the computer program to:

carry, in a bearer establishment instruction, a mapping relationship between a bearer ID of a new bearer and the bitmap; and/or carry, in a bearer releasing instruction, a mapping relationship between a bearer ID of a bearer to be released and the bitmap or the bearer ID of the bearer to be released or indication information indicating that the bearer does not have the duplication function; and/or carry, in a bearer modification instruction, a mapping relationship between a bearer ID of a modified bearer and the bitmap.

The processor 500 is further configured to read the computer program to:

in the case that a preset operation is performed on a target branch of a target bearer and the target bearer is enabled to be configured with at least two branches where the preset operation is enabled to be performed, send, to a terminal, a first mapping relationship between a bearer ID of the target bearer and the bitmap and a second mapping relationship between a branch ID of each target branch and the bitmap.

A computer-readable storage medium is further provided in some embodiments of the present disclosure, where the computer program is executed by a processor to:

indicate, in an implicit or explicit manner, a mapping relationship between a bearer ID and a bitmap in a media access control layer control element (MAC CE), where the MAC CE is a control element for a duplication activation indication or deactivation indication, and the bearer ID is an ID of a bearer configured with a duplication function.

When the program is executed by the processor, all implementation manners in the foregoing method embodiments can be implemented. To avoid repetition, details are not described herein again.

Figure 6:
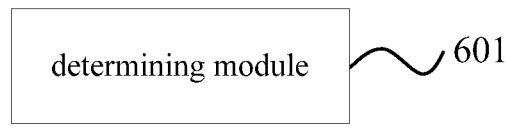
FIG. 6 is a schematic diagram of a third module of a bearer mapping device in an embodiment of the present disclosure.

As shown in FIG. 6, a bearer mapping device applied to a terminal is further provided in an embodiment of the present disclosure, including:

a determining module 601, configured to determine, in an implicit or explicit manner, a mapping relationship between a bearer ID and a bitmap in a media access control layer control element (MAC CE), where the MAC CE is a control element for a duplication activation indication or deactivation indication, and the bearer ID is an ID of a bearer configured with a duplication function.

Optionally, the determining module 601 is configured to:

sort the bearer IDs according to a preset sorting rule according to a preset protocol agreement, to obtain a bearer ID sequence, and indicate a mapping relationship between each of the bearer IDs in the bearer ID sequence and the bitmap in the MAC CE.

Optionally, the preset sorting rule includes: sorting according to a chronological order of bearer establishment or modification or sorting according to an ascending or descending order of the bearer IDs.

Optionally, the determining module 601 is configured to:

map N bearer IDs in the bearer ID sequence to N consecutive positions in the bitmap, where N is a positive integer, the bearer IDs are in a one-to-one correspondence to the positions in the bitmap.

Optionally, the determining module 601 is configured to:

map N bearer IDs in the bearer ID sequence to N consecutive positions in the bitmap in order, according to a present mapping rule;

the present mapping rule includes a mapping rule of mapping from a high bit to a low bit or a mapping rule of mapping from a low bit to a high bit.

Figure 7:
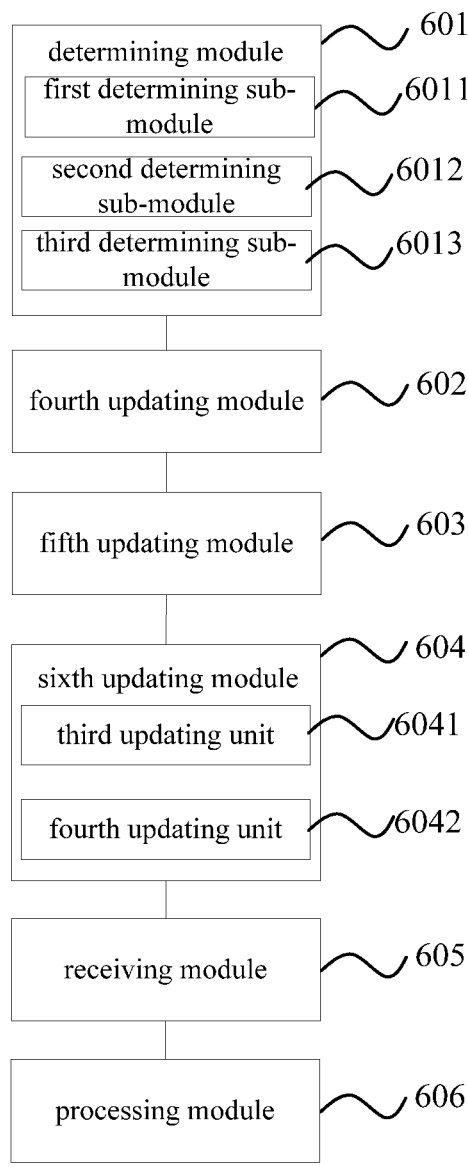
FIG. 7 is a schematic diagram of a fourth module of a bearer mapping device in an embodiment of the present disclosure.

Optionally, as shown in FIG. 7, the bearer mapping device further includes:

a fourth updating module 602, configured to, when establishing a new bearer, add, according to a bearer ID of the new bearer and the preset sorting rule, the bearer ID of the new bearer at a corresponding position in the bearer ID sequence; and/or a fifth updating module 603, configured to, when releasing the bearer, cancel the bearer ID of the bearer to be released from the bearer ID sequence; and/or a sixth updating module 604, configured to, when modifying the bearer, update the bearer ID sequence according to the preset sorting rule.

Optionally, the sixth updating module 604 comprises:

a third updating unit 6041, configured to, in the case that the bearer ID of the bearer is modified, update the bearer ID sequence according to the modified bearer ID and the preset sorting rule;

a fourth updating unit 6042, configured to, in the case that the bearer ID of the bearer is not modified, update the bearer ID sequence according to the preset sorting rule.

Optionally, the determining module 601 is configured to:

determine the mapping relationship between the bearer ID and the bitmap in the MAC CE through a high-layer signaling sent by a base station.

Optionally, the determining module 601 includes:

a first determining sub-module 6011, configured to determine, according to a bearer establishment instruction, a mapping relationship between a bearer ID of a new bearer and the bitmap, where the bearer establishment instruction carries the mapping relationship between the bearer ID of the new bearer and the bitmap; and/or a second determining sub-module 6012, configured to release, according to a bearer releasing instruction, a mapping relationship between a bearer ID of a bearer to be released and the bitmap, where the bearer releasing instruction carries the mapping relationship between the bearer ID of the bearer to be released and the bitmap or the bearer ID of the bearer to be released or indication information indicating that the bearer does not have the duplication function; and/or a third determining sub-module 6013, configured to determine, according to a bearer modification instruction, a mapping relationship between a bearer ID of a modified bearer and the bitmap, where the bearer modification instruction carries the mapping relationship between the bearer ID of the modified bearer and the bitmap.

Optionally, the bearer mapping device further includes:

a receiving module 605, configured to receive a first mapping relationship and a second mapping relationship sent by the base station, where the first mapping relationship is a mapping relationship between a bearer ID of a target bearer and the bitmap, and the second mapping relationship is a mapping relationship between a target branch of the target bearer and the bitmap, and the first mapping relationship and the second mapping relationship are sent in the case that the base station performs a preset operation on the target branch of the target bearer and the target bearer is enabled to be configured with at least two branches where the preset operation is enabled to be performed;

a processing module 606, configured to perform the preset operation on the target branch of the target bearer according to the first mapping relationship and the second mapping relationship.

According to the bearer mapping device in some embodiments of the present disclosure, a mapping relationship between a bearer ID and a bitmap in an MAC CE is indicated in an implicit or explicit manner, so that the terminal and the network side may determine the bearer represented by each bit in the bitmap, and then the terminal and the network side may determine clearly through the MAC CE the bearer needed to be activated or deactivated and the branch thereof.

It should be noted that the bearer mapping device is a device corresponding to the above-mentioned bearer mapping method applied to the terminal side, in which all implementation manners in the foregoing method embodiments are applicable to the embodiments of the device, and the same technology effect can also be achieved.

Figure 8:
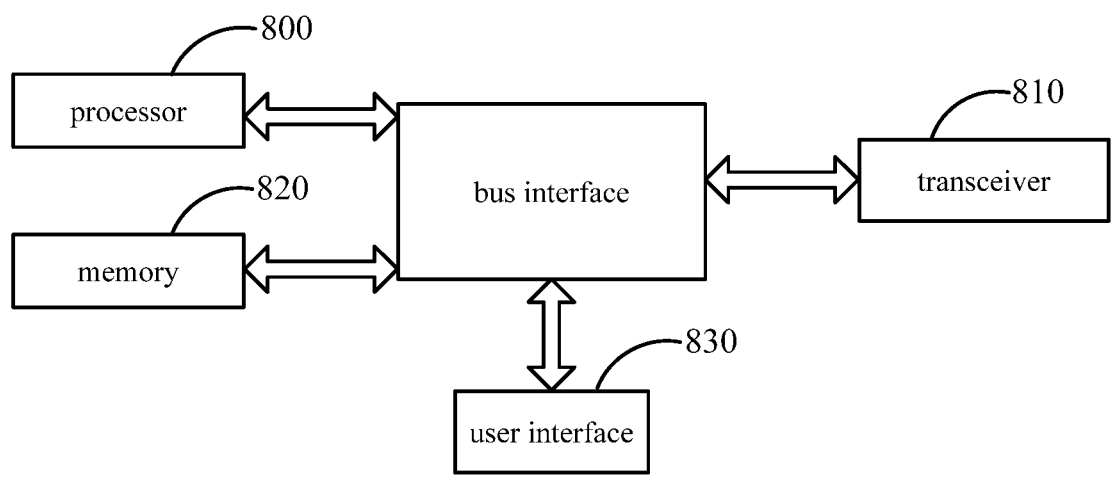
FIG. 8 is a structural block diagram of a terminal in an embodiment of the present disclosure.

Referring to FIG. 8, a terminal is further provided in some embodiments of the present disclosure, including a memory 820, a processor 800, a transceiver 810, a user interface 830, a bus interface, and a bus interface and a computer program stored in the memory 820 and can be executed on the processor 800, the processor 800 is configured to read the program in the memory 820 to perform:

determine, in an implicit or explicit manner, a mapping relationship between a bearer ID and a bitmap in a media access control layer control element (MAC CE), where the MAC CE is a control element for a duplication activation indication or deactivation indication, and the bearer ID is an ID of a bearer configured with a duplication function.

As shown in FIG. 8, the bus architecture may include any number of interconnected buses and bridges. Specifically, one or more processors represented by the processor 800 and various circuits of the memory represented by the memory 820 are linked together. The bus architecture can also link various other circuits such as peripherals, voltage regulators, and power management circuits, which are well known in the art, so they are not described further herein. The bus interface provides an interface. The transceiver 810 may be a plurality of elements, including a transmitter and a transceiver, providing a unit for communicating with various other devices on a transmission medium. For different user equipment, the user interface 830 may also be an interface capable of externally connecting internally required devices. The connected devices include, but are not limited to, a keypad, a display, a speaker, a microphone, a joystick, and the like.

The processor 800 is responsible for managing the bus architecture and general processing, and the memory 820 may store data used by the processor 800 when performing operations.

The processor 800 is further configured to read a program in the memory 820 to:

sort the bearer IDs according to a preset sorting rule according to a preset protocol agreement, to obtain a bearer ID sequence, and indicate a mapping relationship between each of the bearer IDs in the bearer ID sequence and the bitmap in the MAC CE.

Optionally, the preset sorting rule includes: sorting according to a chronological order of bearer establishment or modification or sorting according to an ascending or descending order of the bearer IDs.

The processor 800 is further configured to read a program in the memory 820 to:

map N bearer IDs in the bearer ID sequence to N consecutive positions in the bitmap, where N is a positive integer, the bearer IDs are in a one-to-one correspondence to the positions in the bitmap.

The processor 800 is further configured to read a program in the memory 820 to:

map N bearer IDs in the bearer ID sequence to N consecutive positions in the bitmap in order, according to a present mapping rule;

the present mapping rule includes a mapping rule of mapping from a high bit to a low bit or a mapping rule of mapping from a low bit to a high bit.

The processor 800 is further configured to read a program in the memory 820 to:

when establishing a new bearer, add, according to a bearer ID of the new bearer and the preset sorting rule, the bearer ID of the new bearer at a corresponding position in the bearer ID sequence; and/or when releasing the bearer, cancel the bearer ID of the bearer to be released from the bearer ID sequence; and/or when modifying the bearer, update the bearer ID sequence according to the preset sorting rule.

The processor 800 is further configured to read a program in the memory 820 to:

in the case that the bearer ID of the bearer is modified, update the bearer ID sequence according to the modified bearer ID and the preset sorting rule;

in the case that the bearer ID of the bearer is not modified, update the bearer ID sequence according to the preset sorting rule.

The processor 800 is further configured to read a program in the memory 820 to:

determine the mapping relationship between the bearer ID and the bitmap in the MAC CE through a high-layer signaling sent by a base station.

The processor 800 is further configured to read a program in the memory 820 to:

determine, according to a bearer establishment instruction, a mapping relationship between a bearer ID of a new bearer and the bitmap, where the bearer establishment instruction carries the mapping relationship between the bearer ID of the new bearer and the bitmap; and/or release, according to a bearer releasing instruction, a mapping relationship between a bearer ID of a bearer to be released and the bitmap, where the bearer releasing instruction carries the mapping relationship between the bearer ID of the bearer to be released and the bitmap or the bearer ID of the bearer to be released or indication information indicating that the bearer does not have the duplication function; and/or determine, according to a bearer modification instruction, a mapping relationship between a bearer ID of a modified bearer and the bitmap, where the bearer modification instruction carries the mapping relationship between the bearer ID of the modified bearer and the bitmap.

The processor 800 is further configured to read a program in the memory 820 to:

receive a first mapping relationship and a second mapping relationship sent by the base station, where the first mapping relationship is a mapping relationship between a bearer ID of a target bearer and the bitmap, and the second mapping relationship is a mapping relationship between a target branch of the target bearer and the bitmap, and the first mapping relationship and the second mapping relationship are sent in the case that the base station performs a preset operation on the target branch of the target bearer and the target bearer is enabled to be configured with at least two branches where the preset operation is enabled to be performed;

perform the preset operation on the target branch of the target bearer according to the first mapping relationship and the second mapping relationship.

A computer-readable storage medium storing a computer program is further provided in some embodiments of the present disclosure, where the computer program is executed by a processor to:

determine, in an implicit or explicit manner, a mapping relationship between a bearer ID and a bitmap in a media access control layer control element (MAC CE), where the MAC CE is a control element for a duplication activation indication or deactivation indication, and the bearer ID is an ID of a bearer configured with a duplication function When the program is executed by the processor, all implementation manners in the foregoing method embodiments can be implemented. To avoid repetition, details are not described herein again.

In various embodiments of the present disclosure, it should be understood that the size of the serial numbers of the above processes does not mean the order of execution, and the execution order of each process should be determined by its function and internal logic, and should not limit the embodiments of the present disclosure.

The above are only some embodiments of the present disclosure, but the scope of the present disclosure is not limited herein. Those skilled in the art may also make several improvements and replacements without departing from the principle of the present disclosure, which should also fall within the scope of the present disclosure.

What is claimed is:

1. A bearer mapping method, applied to a base station, comprising:
   indicating, in an implicit or explicit manner, a mapping relationship between a bearer ID and a bitmap in a media access control layer control element (MAC CE),
   wherein the MAC CE is a control element for a duplication activation indication or deactivation indication, and the bearer ID is an ID of a bearer configured with a duplication function,
   wherein the indicating, in the implicit manner, the mapping relationship between the bearer ID and the bitmap in the MAC CE comprises:
   instructing, according to a preset protocol agreement, a terminal to sort the bearer IDs according to a preset sorting rule, to obtain a bearer ID sequence, and indicating a mapping relationship between each of the bearer IDs in the bearer ID sequence and the bitmap in the MAC CE.

2. The bearer mapping method according to claim 1, wherein the preset sorting rule comprises: sorting according to a chronological order of bearer establishment or modification or sorting according to an ascending or descending order of the bearer IDs.

3. The bearer mapping method according to claim 1, wherein the indicating the mapping relationship between each of the bearer IDs in the bearer ID sequence and the bitmap in the MAC CE comprises:
   instructing mapping N bearer IDs in the bearer ID sequence to N consecutive positions in the bitmap, where N is a positive integer, the bearer IDs are in a one-to-one correspondence to the positions in the bitmap.

4. The bearer mapping method according to claim 3, wherein the indicating mapping N bearer IDs in the bearer ID sequence to N consecutive positions in the bitmap comprises:
   instructing mapping N bearer IDs in the bearer ID sequence to N consecutive positions in the bitmap in order, according to a present mapping rule;
   the present mapping rule comprises a mapping rule of mapping from a high bit to a low bit or a mapping rule of mapping from a low bit to a high bit.

5. The bearer mapping method according to claim 1, wherein subsequent to the indicating the mapping relationship between each of the bearer IDs in the bearer ID sequence and the bitmap in the MAC CE, the method further comprises:
  when establishing a Previously Presented bearer, adding, according to a bearer ID of the Previously Presented bearer and the preset sorting rule, the bearer ID of the Previously Presented bearer at a corresponding position in the bearer ID sequence; and/or
  when releasing the bearer, cancelling the bearer ID of the bearer to be released from the bearer ID sequence; and/or
  when modifying the bearer, updating the bearer ID sequence according to the preset sorting rule;
  wherein the when modifying the bearer, updating the bearer ID sequence according to the preset sorting rule comprises:
  in the case that the bearer ID of the bearer is modified, updating the bearer ID sequence according to the modified bearer ID and the preset sorting rule;
  in the case that the bearer ID of the bearer is not modified, updating the bearer ID sequence according to the preset sorting rule.

6. The bearer mapping method according to claim 1, wherein subsequent to the indicating, in the implicit or explicit manner, the mapping relationship between the bearer ID and the bitmap in the MAC CE, the method further comprises:
  in the case that a preset operation is performed on a target branch of a target bearer and the target bearer is enabled to be configured with at least two branches where the preset operation is enabled to be performed, sending, to a terminal, a first mapping relationship between a bearer ID of the target bearer and the bitmap and a second mapping relationship between a branch ID of each target branch and the bitmap.

7. A bearer mapping method, applied to a terminal, comprising:
  determining, in an implicit or explicit manner, a mapping relationship between a bearer ID and a bitmap in a media access control layer control element (MAC CE), wherein the MAC CE is a control element for a duplication activation indication or deactivation indication, and the bearer ID is an ID of a bearer configured with a duplication function,
  wherein the determining, in the implicit manner, the mapping relationship between the bearer ID and the bitmap in the MAC CE comprises:
  sorting the bearer IDs according to a preset sorting rule according to a preset protocol agreement, to obtain a bearer ID sequence, and indicating a mapping relationship between each of the bearer IDs in the bearer ID sequence and the bitmap in the MAC CE.

8. The bearer mapping method according to claim 7, wherein the preset sorting rule comprises: sorting according to a chronological order of bearer establishment or modification or sorting according to an ascending or descending order of the bearer IDs.

9. The bearer mapping method according to claim 7, wherein the determining the mapping relationship between each of the bearer IDs in the bearer ID sequence and the bitmap in the MAC CE comprises:
  mapping N bearer IDs in the bearer ID sequence to N consecutive positions in the bitmap, where N is a positive integer, the bearer IDs are in a one-to-one correspondence to the positions in the bitmap.

10. The bearer mapping method according to claim 9, wherein the mapping N bearer IDs in the bearer ID sequence to N consecutive positions in the bitmap comprises:
  mapping N bearer IDs in the bearer ID sequence to N consecutive positions in the bitmap in order, according to a present mapping rule;
  the present mapping rule comprises a mapping rule of mapping from a high bit to a low bit or a mapping rule of mapping from a low bit to a high bit.

11. The bearer mapping method according to claim 7, wherein subsequent to the determining the mapping relationship between each of the bearer IDs in the bearer ID sequence and the bitmap in the MAC CE, the method further comprises:
  when establishing a Previously Presented bearer, adding, according to a bearer ID of the Previously Presented bearer and the preset sorting rule, the bearer ID of the Previously Presented bearer at a corresponding position in the bearer ID sequence; and/or
  when releasing the bearer, cancelling the bearer ID of the bearer to be released from the bearer ID sequence; and/or
  when modifying the bearer, updating the bearer ID sequence according to the preset sorting rule;
  wherein the when modifying the bearer, updating the bearer ID sequence according to the preset sorting rule comprises:
  in the case that the bearer ID of the bearer is modified, updating the bearer ID sequence according to the modified bearer ID and the preset sorting rule;
  in the case that the bearer ID of the bearer is not modified, updating the bearer ID sequence according to the preset sorting rule.

12. The bearer mapping method according to claim 7, further comprising:
  receiving a first mapping relationship and a second mapping relationship sent by the base station, wherein the first mapping relationship is a mapping relationship between a bearer ID of a target bearer and the bitmap, and the second mapping relationship is a mapping relationship between a target branch of the target bearer and the bitmap, and the first mapping relationship and the second mapping relationship are sent in the case that the base station performs a preset operation on the target branch of the target bearer and the target bearer is enabled to be configured with at least two branches where the preset operation is enabled to be performed;
  performing the preset operation on the target branch of the target bearer according to the first mapping relationship and the second mapping relationship.

13. A base station, comprising: a memory, a processor and a computer program stored in the memory and executable on the processor, wherein the processor executes the computer program for:
  indicating, in an implicit or explicit manner, a mapping relationship between a bearer ID and a bitmap in a media access control layer control element (MAC CE), wherein the MAC CE is a control element for a duplication activation indication or deactivation indication, and the bearer ID is an ID of a bearer configured with a duplication function,
  wherein the indicating, in the implicit manner, the mapping relationship between the bearer ID and the bitmap in the MAC CE comprises:
  instructing, according to a preset protocol agreement, a terminal to sort the bearer IDs according to a preset sorting rule, to obtain a bearer ID sequence, and indicating a mapping relationship between each of the bearer IDs in the bearer ID sequence and the bitmap in the MAC CE.

14. A terminal, comprising a memory, a processor and a computer program stored in the memory and executable on the processor, wherein the processor executes the computer program to perform the bearer mapping method according to claim 7.

* * * * *